Sept. 2, 1952      H. ANDREWS      2,608,993
LIQUID FLOW CONTROLLING VALVE
Filed Oct. 25, 1948      2 SHEETS—SHEET 1
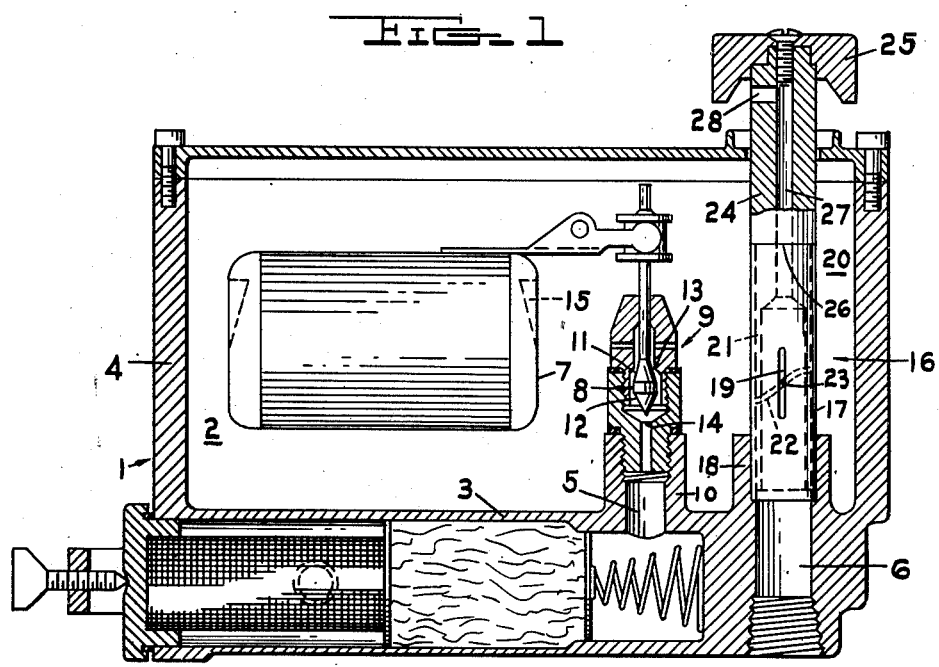
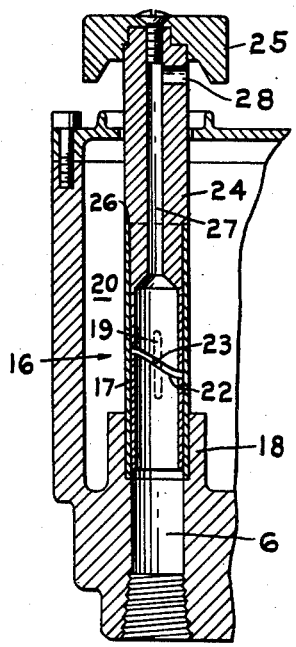
INVENTOR.
HENRY ANDREWS
BY
ATTORNEYS Sept. 2, 1952 H. ANDREWS 2,608,993
LIQUID FLOW CONTROLLING VALVE
Filed Oct. 25, 1948 2 SHEETS—SHEET 2
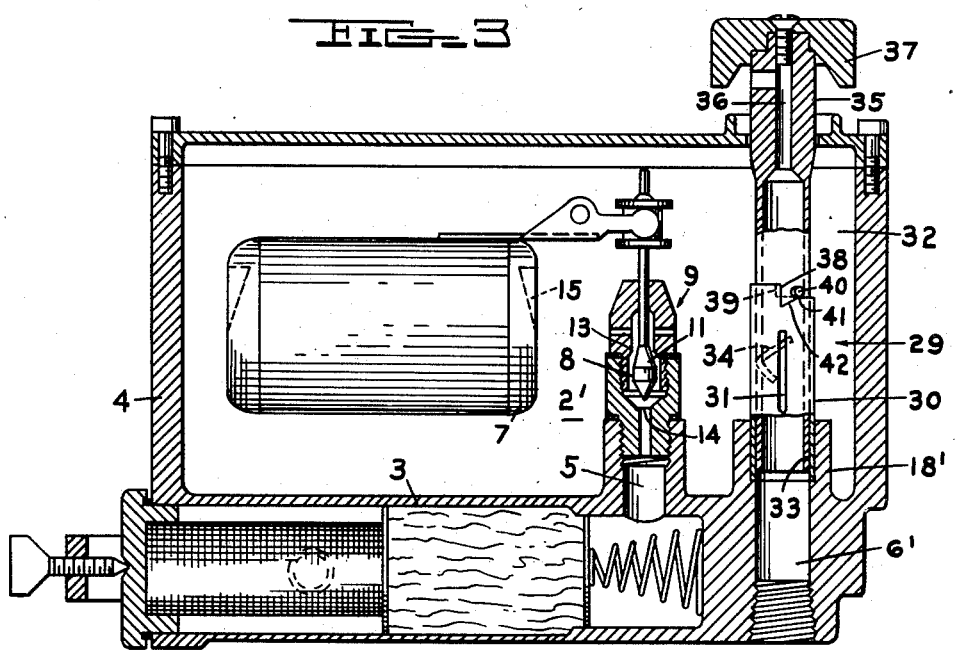
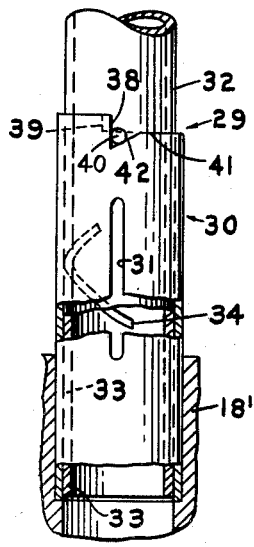 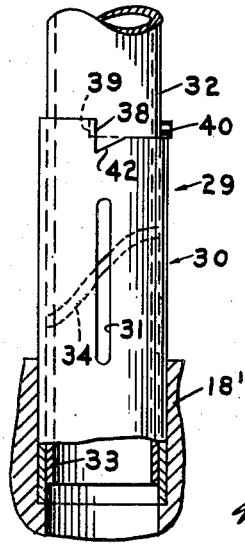
INVENTOR.
HENRY ANDREWS
BY
ATTORNEYS Patented Sept. 2, 1952

2,608,993

UNITED STATES PATENT OFFICE 2,608,993

LIQUID FLOW CONTROLLING VALVE

Henry Andrews, Lansing, Mich., assignor to Piatt Products Corporation, Lansing, Mich., a corporation of Michigan Application October 25, 1948, Serial No. 56,326

2 Claims. (Cl. 137—577)

1

The invention relates to valve devices for controlling the flow of liquid and refers more particularly to valve devices having a casing provided with a reservoir, an inlet and an outlet and a valve for controlling the flow of liquid from the reservoir to the outlet.

The invention has for one of its objects to provide an improved construction of valve device in which the valve is adjustable to variably control the flow of liquid from the reservoir to the outlet by adjusting the position of the valve orifice with respect to the normal level of liquid.

The invention has for another object to provide an improved valve having provision for venting the valve and liquid outlet to avoid trapping of air in the valve and outlet.

The invention has for further objects to provide an improved valve having means for limiting the adjustment of the valve and to provide an improved valve having means for quickly automatically closing the valve during the final portion of its closing movement and quickly opening the valve during the initial portion of its opening movement.

With these and other objects in view, the invention resides in the novel features of construction and combinations and arrangements of parts as more fully hereinafter set forth.

In the drawings:

Figure 1 is a setcional view of the valve device with the valve controlling the flow of liquid from the reservoir to the outlet partly in elevation;

Figure 2 is a view similar to a portion of Figure 1 showing the valve controlling the flow of liquid from the reservoir to the outlet in section;

Figure 3 is a view similar to Figure 1 showing a modified construction;

Figures 4 and 5 are views similar to a portion of Figure 3 showing the valve controlling the flow of liquid from the reservoir to the outlet in different positions of adjustment.

The valve device for controlling the flow of liquid is designed particularly for use with oil burners and comprises the casing 1 provided with the reservoir 2 formed by the bottom and side walls 3 and 4 respectively and also provided with the inlet 5 and outlet 6 which extend through the bottom wall. For normaly maintaining a substantially constant level of liquid in the res-

2 ervoir, there is the float 7 within the reservoir operatively connected to the valve 8 which is located within the fitting 9 threaded at its lower end into the tubular boss 10 forming part of the inlet and extending upwardly within the reservoir. The construction of float, valve, fitting and operative connection is standard. In general, the valve has its head formed with the upwardly and downwardly tapered portions 11 and 12 respectively and the fitting has the upper and lower seats 13 and 14 respectively for engagement by the tapered portions 11 and 12 respectively, these seats being in the passageway in the fitting leading from the inlet 5 to the reservoir 2. In normal operation, the float maintains a substantially constant level of oil in the reservoir by lowering and raising the valve to move its tapered portion 12 into engagement with or away from the seat 14. In the event that the level of oil in the reservoir rises a predetermined distance above the normal level, the float is constructed to raise the valve and move its tapered portion 11 into engagement with the seat 13 and shut off further flow of oil into the reservoir. As shown, the ends of the float are sheared inwardly at 15 so that the oil in the reservoir upon reaching a predetermined height above the normal level flows into the float and destroys its buoyancy so that it will lower and raise the valve.

For controlling the flow of oil from the reservoir 2 to the outlet 6 I have provided the valve 16 between the reservoir and the outlet. This valve comprises the hollow cylindrical member or sleeve 17 fixed in the tubular boss 18 forming part of the outlet 6 and extending substantially vertically upwardly above the normal level of oil in the reservoir. The member 17 registers with the outlet 6 and its interior communicates with this outlet. This hollow cylindrical member is formed with the longitudinally extending or substantially vertical slot 19 in its wall having its lower end located above the bottom of the reservoir 2 so that sufficient oil will be trapped in the reservoir to prevent the float from lowering sufficiently to close the valve operated by the float. The valve 16 also comprises the rotatable member 20 in axial alignment with the fixed member 17 and having the hollow cylindrical portion 21 telescopically fitting within the fixed member, the lower end of this portion being open and registering with and placing the interior of the portion in communication with the outlet 6. The hollow cylindrical portion has its wall provided with the slot 22 which is inclined to the axis of the rotatable member and is in effect a spiral slot. The slots 19 and 22 are positioned to intersect upon rotation of the rotatable member 20 and form at the intersection the orifice 23 which is vertically movable to vary the height of the oil in the reservoir above the orifice which serves to vary the flow of oil through the orifice from the reservoir to the outlet. In the normal closed position of the valve the slots do not intersect, while in the fully open position of the valve the lower end portion of the inclined slot 22 intersects the substantially vertical slot 19 to locate the orifice at its lowermost position. The rotatable member 20 is also formed with the portion 24 which extends upwardly through the top wall of the casing and has secured to its upper end the knob 25 for manually rotating the rotatable member. The portion 24 is of substantially the same external diameter as that of the fixed member 17 and has the annular shoulder 26 resting on the upper end of the member 17. For the purpose of venting the outlet 6, the portion 24 is formed with the axial and lateral passageways 27 and 28 respectively forming an air vent passage communicating with the interior of the cylindrical portion 21 and the atmosphere above the casing.

The structure illustrated in Figures 3, 4 and 5 differs from that illustrated in Figures 1 and 2 in the construction of the valve 29 for controlling the flow of oil from the reservoir 2' to the outlet 6'. This valve comprises the hollow cylindrical member or sleeve 30 fixed within the tubular boss 18' forming part of the outlet 6' and extending substantially upwardly within the reservoir. This fixed member has its wall provided with the longitudinally extending or substantially vertical slot 31, the lower end of which is also above the bottom of the reservoir. The valve 29 also comprises the rotatable member 32 which has the hollow cylindrical portion 33 telescopically engaging and fitting within the fixed member. These two members are in axial alignment and register and communicate with the outlet 6'. The wall of this hollow cylindrical portion is formed with the slot 34 which is inclined to the axis of the portion and is in effect a spiral slot positioned to intersect the substantially vertical slot upon rotation of the rotatable member to cooperate therewith in forming at the intersection of the slots an orifice for placing the reservoir 2' in communication with the outlet 6'. The upper end portion 35 of the rotatable member 32 is formed with the air venting passage 36 for placing the interior of the hollow cylindrical portion 33 and the outlet 6' in communication with the air above the casing of the valve device and the knob 37 is secured to the upper end for manually rotating the rotatable member.

To limit the rotation or angular movement of the rotatable member 32, the upper end of the fixed member 30 is formed with the substantially vertically extending shoulders 38 and 39 and the valve member 32 has fixedly secured thereto the transverse pin 40 for engaging these shoulders. The upper end of the fixed member 30 is also provided with the lateral portion 41 joining the shoulder 39 and the downwardly notched portion 42 joining the shoulder 38 and the lateral portion 41, the pin 40 being movable over and engaging these portions. The shoulder 38 when engaged by the pin 40 determines the closed position of the valve at which time the slots 31 and 34 do not intersect as shown in Figure 4. The shoulder 39 when engaged by the pin 40 determines the fully open position of the valve at which the orifice formed by the intersection of the slots 31 and 34 is in its lowermost position. The downwardly notched portion 42 is provided to automatically secure a rapid closing movement of the valve during the final portion of the rotation of the rotatable member in a closing direction and to also secure a rapid opening movement of the valve during the initial portion of the rotation of the rotatable member in an opening direction. The inclination is such that the transverse pin will ride downwardly when the rotatable member is in a position placing the transverse pin between the positions shown in Figures 3 and 4. With this construction the valve may be adjusted by turning the rotatable member 32 from a position with the pin 40 resting on the lateral portion 41 adjacent the notched portion 42 to a position with the pin resting on the lateral portion and engaging the shoulder 39 to provide for flow of oil from the reservoir to the outlet from somewhat above the shutoff point to maximum. Specifically, if a burner is designed to operate between $\frac{1}{16}$ and $\frac{1}{2}$ gallon of oil per hour the rotatable member of the valve may be adjusted to secure the desired flow of oil within this range, but if the rotatable member of the valve is turned to a position for securing less than $\frac{1}{16}$ gallon of oil per hour the rotatable member will automatically drop to shutoff position by reason of the pin riding downwardly over the notched portion. As a result, the valve makes it impossible to operate the burner between the 0 and $\frac{1}{16}$ gallon limits.

What I claim as my invention is:

1. A liquid flow controlling valve for a casing having a reservoir, said valve comprising a fixed substantially vertical hollow cylindrical member providing an outlet, said member having its wall provided with a substantially vertical slot and having its upper end provided with substantially vertical shoulders with a lateral portion joining one of said shoulders and a downwardly notched portion joining the other of said shoulders and said lateral portion, and a rotatable member having a hollow cylindrical portion fitting within said first mentioned member and registering with the outlet with its wall provided with a spiral slot positioned to intersect said substantially vertical slot and cooperate therewith to form a substantially vertically movable inlet orifice upon rotation of said rotatable member and a pin extending transversely of said rotatable member and positioned between said substantially vertical shoulders and engageable with said lateral and notched portions.

2. A liquid flow controlling device comprising a casing having a reservoir, an inlet and an outlet, a valve in said reservoir comprising relatively rotatable substantially vertical inner and outer members having telescoping hollow cylindrical portions registering with the outlet, said telescoping portions each having a slot in its wall with one slot extending in a direction transversely of the other at an acute angle thereto and adapted to cooperate therewith to form a substantially vertically movable inlet orifice upon rotation of one of said members, said outer member having its upper end provided with substantially vertical shoulders with a lateral portion joining one of said shoulders and a downwardly notched portion joining the other of said shoulders and said lateral portion, and a pin secured to and extending transversely of said inner member and positioned between said substantially vertical shoulders and engageable with said lateral and notched portions.

HENRY ANDREWS.

REFERENCES CITED

The following references are of record in the file of this patent:

UNITED STATES PATENTS

| Number | Name | Date |
|---|---|---|
| 836,606 | Pynes | Nov. 20, 1906 |
| 1,109,768 | Laux | Sept. 8, 1914 |
| 1,989,721 | Toelle | Feb. 5, 1935 |
| 2,151,001 | Anderson | Mar. 21, 1939 |
| 2,363,821 | Webster | Nov. 28, 1944 |